United States Patent
Chapnik

(10) Patent No.: US 8,272,238 B2
(45) Date of Patent: *Sep. 25, 2012

(54) CASE WITH SECURABLE CLOSURE AND METHOD

(76) Inventor: Jason Chapnik, Freeport (BS)

( * ) Notice: Subject to any disclaimer, the term of this patent is extended or adjusted under 35 U.S.C. 154(b) by 0 days.

This patent is subject to a terminal disclaimer.

(21) Appl. No.: 13/169,840

(22) Filed: Jun. 27, 2011

(65) Prior Publication Data

US 2011/0260596 A1 Oct. 27, 2011

Related U.S. Application Data

(63) Continuation of application No. 10/970,845, filed on Oct. 22, 2004, now Pat. No. 7,966,850.

(60) Provisional application No. 60/513,539, filed on Oct. 24, 2003.

(51) Int. Cl.
*B65D 85/57* (2006.01)
*E05B 73/00* (2006.01)

(52) U.S. Cl. .............. 70/57.1; 70/63; 70/289; 70/295; 206/1.5; 206/308.1; 206/308.2

(58) Field of Classification Search .............. 70/57.1, 70/63, 286–290, 295, 304, 312, 445, 158, 70/163–173; 206/1.5, 308.1, 308.2
See application file for complete search history.

(56) References Cited

U.S. PATENT DOCUMENTS

| | | | | |
|---|---|---|---|---|
| 3,063,282 A * | 11/1962 | Aytes | | 70/163 |
| 3,204,436 A * | 9/1965 | Nemsky | | 70/63 |
| 3,421,347 A * | 1/1969 | Sotory | | 70/63 |
| 3,445,021 A * | 5/1969 | Johnson | | 215/206 |
| 3,731,505 A * | 5/1973 | Rosenberg et al. | | 70/63 |
| 3,802,231 A * | 4/1974 | Piq | | 70/165 |
| 3,893,313 A * | 7/1975 | Kobayashi | | 70/63 |
| 4,676,370 A * | 6/1987 | Rudick | | 206/1.5 |
| 4,702,533 A * | 10/1987 | Seifert | | 312/9.22 |
| 4,787,222 A * | 11/1988 | Irazoqui et al. | | 70/57 |
| 5,118,175 A * | 6/1992 | Costello | | 312/242 |
| 5,125,661 A * | 6/1992 | Jarboe | | 273/156 |
| 5,235,831 A * | 8/1993 | Lauria et al. | | 70/312 |
| 5,598,728 A * | 2/1997 | Lax | | 70/276 |
| 6,000,541 A * | 12/1999 | Yu | | 206/308.1 |
| 6,082,156 A * | 7/2000 | Bin | | 70/57.1 |
| 6,202,454 B1 * | 3/2001 | Nakasuji | | 70/57.1 |
| 6,202,455 B1 * | 3/2001 | Su | | 70/68 |
| 6,561,347 B1 * | 5/2003 | Lax | | 206/308.1 |
| 6,842,105 B1 * | 1/2005 | Henderson et al. | | 340/5.73 |
| 6,843,081 B1 * | 1/2005 | Painter | | 70/63 |
| 6,874,626 B2 * | 4/2005 | Lew et al. | | 206/308.1 |
| 7,032,415 B2 * | 4/2006 | Young | | 70/18 |
| 7,107,803 B1 * | 9/2006 | Swanson | | 70/289 |
| 7,252,204 B1 * | 8/2007 | Small | | 215/206 |
| 7,966,850 B2 * | 6/2011 | Chapnik | | 70/57.1 |

(Continued)

*Primary Examiner* — Lloyd Gall
(74) *Attorney, Agent, or Firm* — Bereskin & Parr LLP; Kenneth L. Bousfield

(57) ABSTRACT

A case has a body defining an accommodation such as may be sized to accept a squat cylindrical object such as a magnetic tape, a CD-ROM, a DVD or such like object. The case may include a locking mechanism, and that locking mechanism may be a combination locking mechanism. The locking mechanism may permit axial access to the accommodation, or it may permit radial access to the accommodation. The accommodation may lie in whole or in part between relatively movable members of the locking mechanism.

17 Claims, 14 Drawing Sheets

U.S. PATENT DOCUMENTS

| | | |
|---|---|---|
| 2001/0050239 A1* | 12/2001 | Ishii .......................... 206/308.1 |
| 2003/0085139 A1* | 5/2003 | Loritz ........................ 206/308.1 |
| 2005/0205442 A1* | 9/2005 | Spagna ...................... 206/308.2 |
| 2006/0185994 A1* | 8/2006 | Schuurs ..................... 206/308.1 |

\* cited by examiner

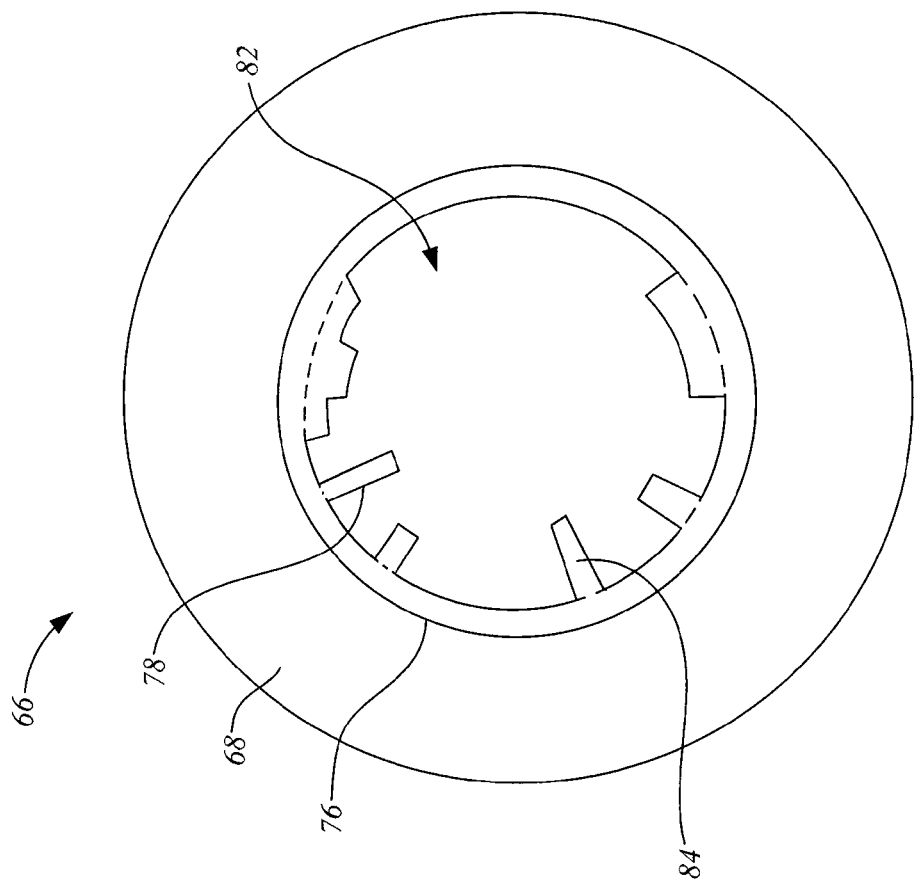
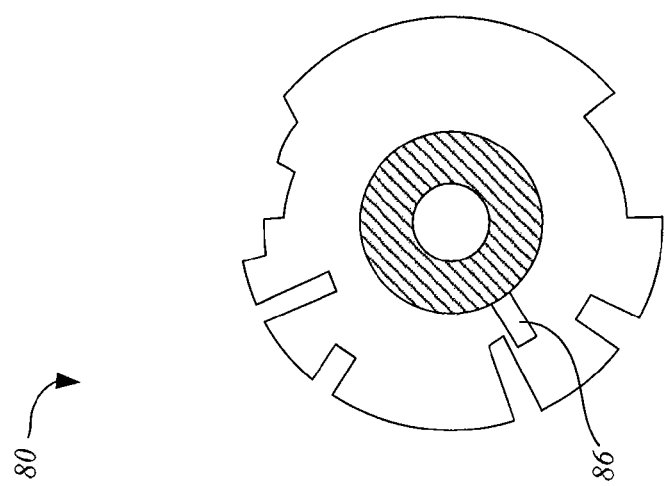
*FIGURE 3b*
*FIGURE 3a*

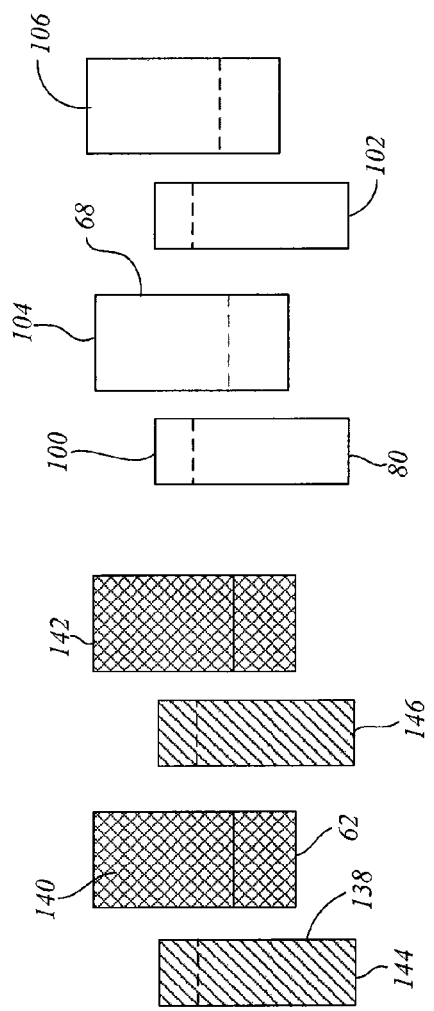
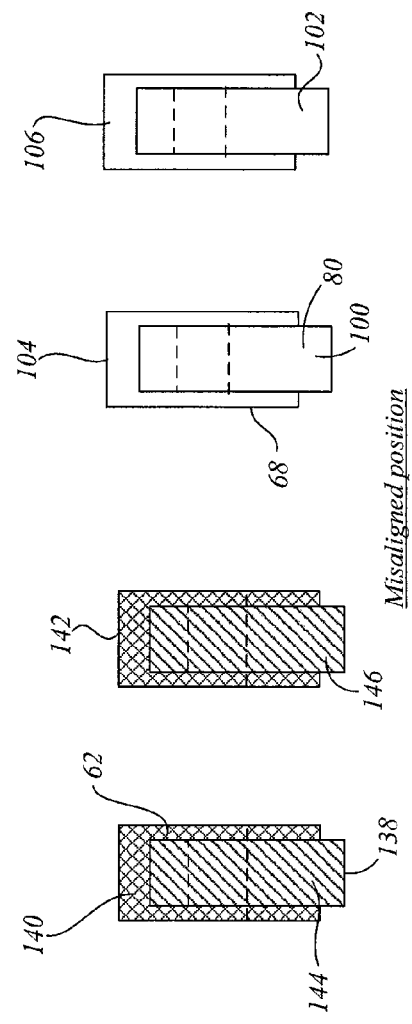
FIGURE 3c
*Aligned position*
FIGURE 3d
*Misaligned position*

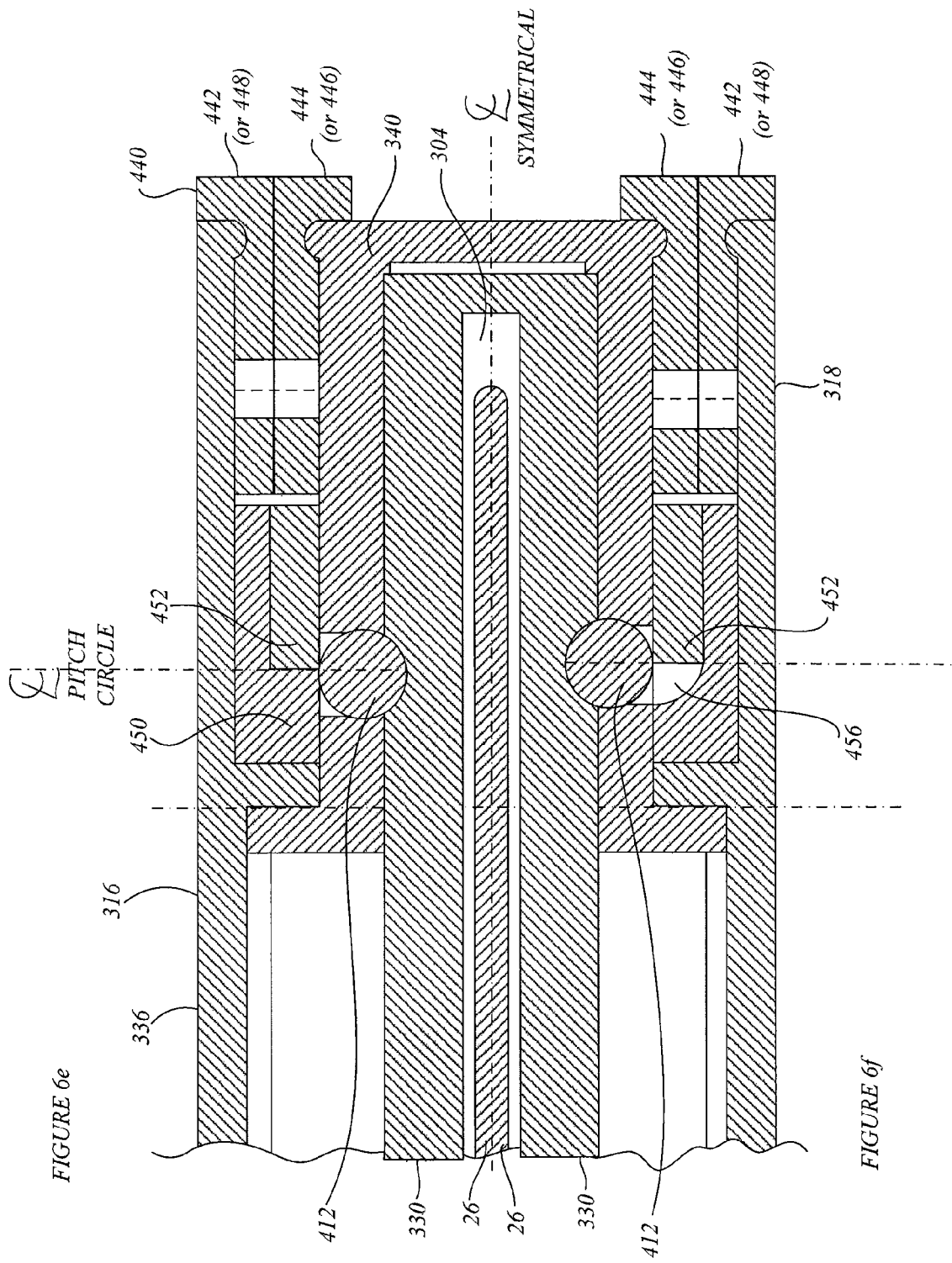

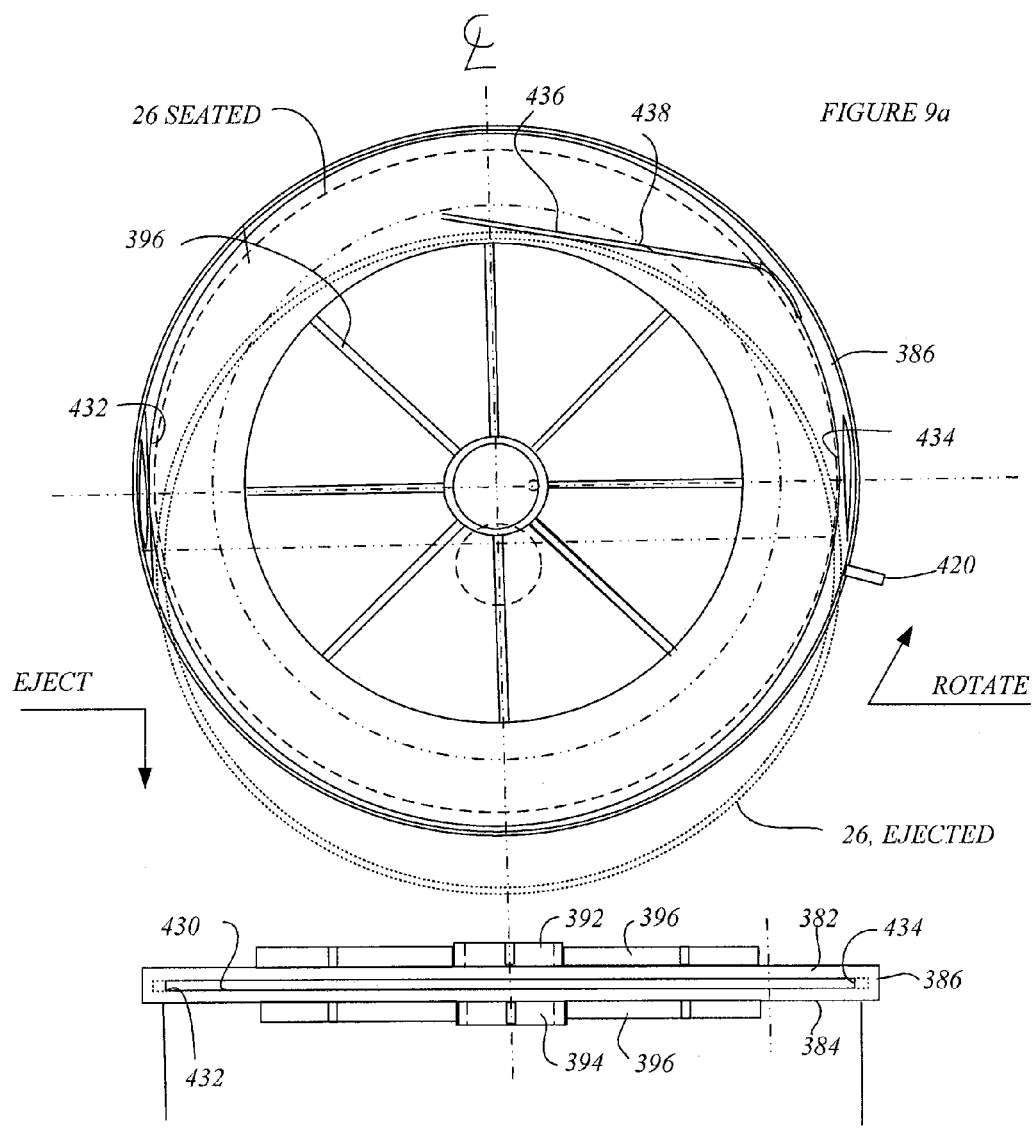

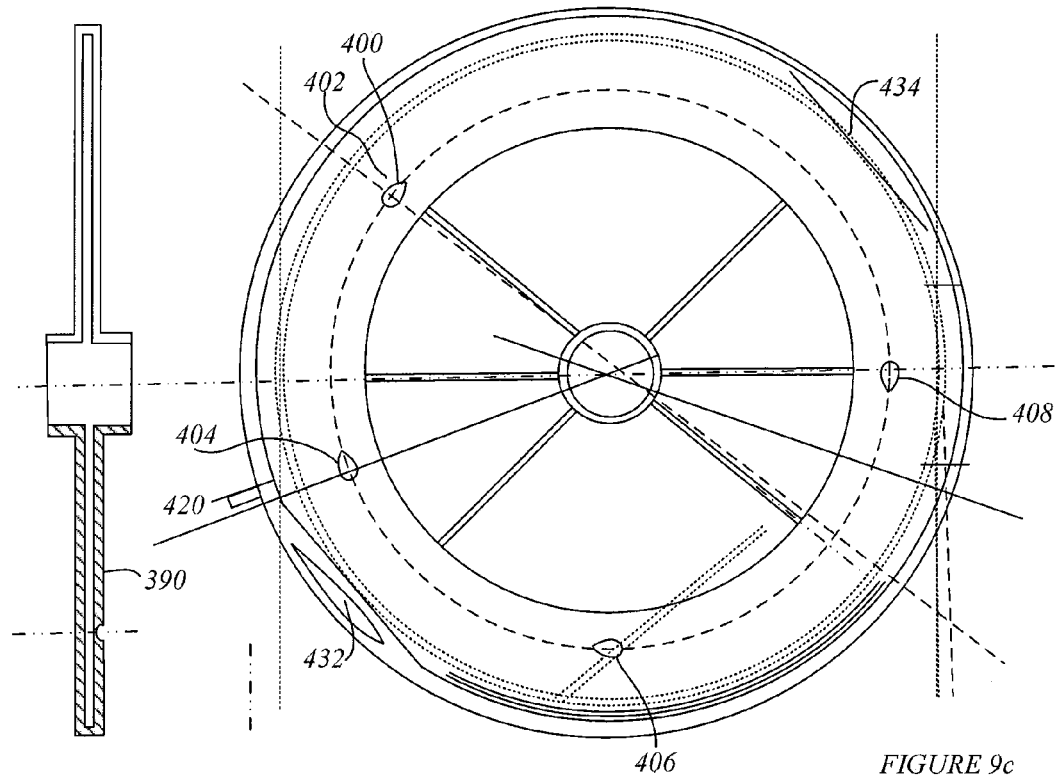
FIGURE 9c
FIGURE 9d
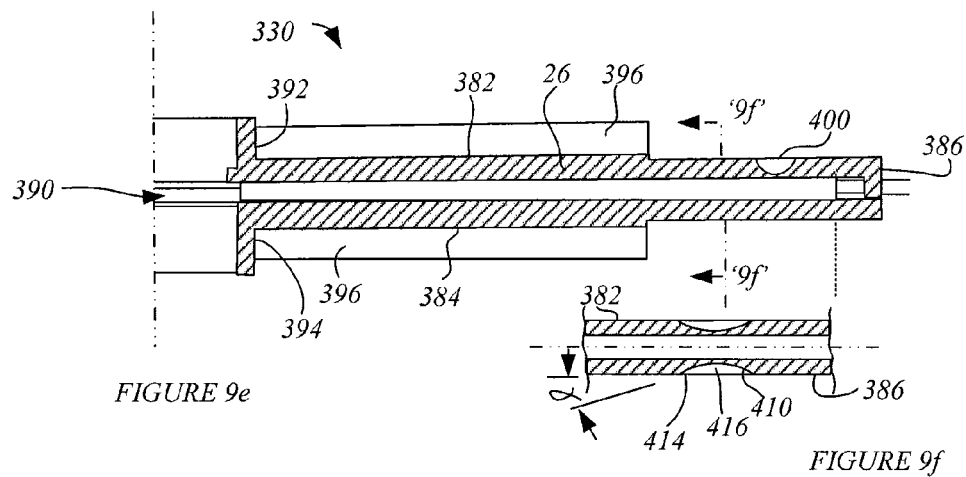
FIGURE 9e
FIGURE 9f

CASE WITH SECURABLE CLOSURE AND METHOD

This application claims the benefit of priority under 35 USC 120 on the basis of U.S. patent application Ser. No. 10/970,845, filed Oct. 22, 2010, (for issue Jun. 28, 2011 as U.S. Pat. No. 7,966,850), itself a continuation claiming the benefit of U.S. Provisional Application No. 60/513,539 filed Oct. 24, 2003, the specifications of each of those applications being incorporated herein by reference.

FIELD OF THE INVENTION

The present invention relates to preventing unauthorised access to fixed media and the content contained thereon.

BACKGROUND OF THE INVENTION

It may be desirable to be able to lock an object within a casing, where the casing itself defines the enclosure cavity, and also forms, or co-operates in, the locking mechanism.

For example, in some instances, information may be stored in a number of digital different formats of digital storage media, such as CD-ROM, CD-R, DVD or other fixed media such as a minidisk, a "smart card" or a Memory Stick™. The security of the information stored on such media may be of concern to personal and business users. Security may be provided by encrypting the content before writing to a disk or other fixed medium. However, this may be time consuming and difficult for some users. In addition, encryption may require the use of a computer to access the information on the chosen storage medium, thereby limiting the number of applications and the user base. Another solution involves a hardware lock such as a "bicycle" type lock proposed by Lock Manufacturing Company, California, USA. This lock includes a cable which is passed through an opening of a jewel case and the center of the disk to secure one or more disks to a workstation. However, this type of lock may require a key, which may be lost or mislaid, and may be non-portable, as it may typically be attached to an object that is generally not readily moveable, or one whose removal might tend to attract notice, such as a workstation. Also, this kind of lock may be defeated with bolt cutters or other tools without harming the disk or its content.

SUMMARY OF THE INVENTION

In an aspect of the invention there is an enclosure assembly having a body defining an accommodation for an object, the assembly including a locking mechanism operable to unlock according to a combination, and at least a portion of the accommodation is enclosed within the locking mechanism.

In a feature of that aspect of the invention, the accommodation is disk shaped. In another feature, the accommodation has a radius and an axial depth, and the radius is at least 3 times as great as the axial depth. In a further feature, the assembly is operable to permit predominantly axial removal of objects from the accommodation. In a yet further feature, the assembly is operable to permit radial removal of objects therein. In another feature, the body includes a graspable rotor member and a graspable stator member, and at least a portion of the accommodation lies between the rotor member and the stator member. In still another feature, the locking mechanism includes at least one circumferentially movable annular ring, and at least a portion of the accommodation lies radially inward of the annular ring. In a still further feature, the assembly includes a carrier having the accommodation formed therein. The carrier is mounted within a casing. The carrier has a first port. The casing has a second port. The carrier is rotatably movable within the casing to align the ports to give access to the accommodation. In a still yet further feature the assembly includes an ejector operable to urge objects out of the accommodation. In still another feature, the locking mechanism is adjustable to permit a change of the combination.

In another aspect of the invention, there is an enclosure assembly for a disk shaped object. The enclosure assembly has an accommodation therein having a radius and a through thickness, the radius and through thickness having an aspect ratio of greater than 10:1. The accommodation has a movable member operable to govern access to the accommodation. The movable member is movable between a first position yielding access to accommodation, and a second position obstructing access to the accommodation. The assembly includes a locking apparatus operable to secure the movable member in the second position. The locking apparatus is a manually operable apparatus releasable according to a combination, and at least a portion of the accommodation lies within at least a portion of the locking apparatus.

In an additional feature of that aspect of the invention, the assembly includes a movable central boss member. In another feature, the central boss member is axially retractable. In still another feature, the assembly is operable to permit predominantly axial removal of objects from the accommodation. In still yet another feature, the assembly is operable to permit radial removal of objects therein. In a further feature, the body includes a graspable rotor member and a graspable stator member, and at least a portion of the accommodation lies between the rotor member and the stator member. In another feature the locking mechanism includes at least one circumferentially movable annular ring, and at least a portion of the accommodation lies radially inward of the annular ring. In still another feature, the assembly includes a carrier having the accommodation formed therein. The carrier is mounted within a casing. The carrier has a first port. The casing has a second port, and the carrier is rotatably movable within the casing to align the ports to give access to the accommodation. In still another feature, the assembly includes an ejector operable to urge objects out of the accommodation.

In another aspect of the invention there is a locking means for securing fixed media. The locking means includes a combination-style lock operable between a locked position and an unlocked position by performing a sequence of operations.

In another aspect of the invention, a locking means for securing a disk is provided, the locking means includes a combination-style lock engaging the aperture of the disk, and the combination-style lock is operable between a locked position and an unlocked position, the lock may be unlocked following a sequence of operations such as inputting a suitable combination code. In another aspect of the invention, the combination-style locking means is implemented between the aperture of the disk and an edge of the disk, and operable between a locked position and an unlocked position. In yet another aspect of the invention, a combination-style locking means is implemented peripherally of the disk. In even yet another aspect of the invention, the combination-style locking means is implemented between a section of an edge of the disk and the surface of the disk, in a clamp like manner, such that arms of the clamp are operable between a locked position and an unlocked position.

In even yet another aspect of the invention, the combination-style locking means is implemented with the fixed media in a clamp like manner, such that the arms of the clamp are operable between a locked position and an unlocked position.

Alternatively, the fixed media is secured by a combination-style locking means implemented in a clam-shell manner and operable between a locked position and an unlocked position.

BRIEF DESCRIPTION OF THE DRAWINGS

The principles of the invention may better be understood with reference to the accompanying Figures provided by way of illustration of an exemplary embodiment, or embodiments, incorporating principles and aspects of the present invention, and in which:

FIG. 3a is a sectional view, looking downward, of a member of the apparatus of FIG. 1;

FIG. 3b is a top view of a member for co-operation with the member of FIG. 3a;

FIG. 3c is a conceptual illustration of tooth positioning of an upper locking array and a lower locking array as aligned to permit disengagement of locking parts;

FIG. 3d is a conceptual illustration of tooth positioning of the upper and lower locking arrays of FIG. 3c as misaligned in a position to resist disengagement of locking parts;

FIG. 6d shows half a diametral cross-section of the closure apparatus of FIG. 6a;

FIG. 6e shows a detail of the closure apparatus of FIG. 6d in a first condition;

FIG. 6f shows a detail of the closure apparatus of FIG. 6d in a second condition;

FIG. 7a shows a view on arrows '7a-7a' of FIG. 7b, showing a plan view looking downward of half of a casing shell of the closure apparatus of FIG. 6a;

FIG. 7b shows half a cross-section of a casing shell of the closure apparatus of FIG. 6a;

FIG. 8a shows a peripheral wall casing member of the closure apparatus of FIG. 6a;

FIG. 8b shows a partially sectioned side view of the peripheral wall casing member of FIG. 8a;

FIG. 9a shows a carrier member of the apparatus of FIG. 6a as seen from above, with the location of an internal biasing member shown in solid lines in an 'eject' position;

FIG. 9b shows a side view of the carrier member of FIG. 9a;

FIG. 9c shows the carrier member of FIG. 9a in a closed and filled condition;

FIG. 9d shows a diametral half-sectional view of the carrier member of FIG. 9a;

FIG. 9e shows an enlarged sectional detail of the carrier member of FIG. 9a;

FIG. 9f shows a further enlarged detail of the carrier member of FIG. 9a on section '9f-9f' of FIG. 9e;

FIG. 10b shows a combination adjustment apparatus of the closure apparatus of FIG. 10a; and FIG. 10c shows a detail or a retainer ring assembly of the apparatus of FIG. 10a;

DETAILED DESCRIPTION OF EMBODIMENTS OF THE INVENTION

In this description there may be reference to an enclosure having a generally disk-like shape. Such a body may be described in terms of a cylindrical polar co-ordinate system. In such a system, there may be an axial direction, that direction being coincident with, or parallel to, an axis about which a body of rotation, such as a circular disk, may be formed. This axis may also be termed the vertical or z-axis in some instances. A radial direction may be defined in a plane perpendicular to the axial direction, with distances being measured away from the axis of rotation, or employing the axis of rotation as a datum. A circumferential direction may be taken at a constant radius from the z-axis, in a direction mutually perpendicular to the radial direction and the axial direction. Illustrations herein are not necessarily to scale, and certain features may be shown in a schematic, simplified, conceptual or exaggerated form for the purpose of facilitating explanation.

While reference may be made in the description to digital storage media, such as CD-ROM, DVD or other devices, the apparatus described herein may not be limited to such uses, and may be used to enclose, and contain in a locked condition, other objects, which may include analogue data storage media, or non-data storage object that a user may wish to enclosure in a locked or otherwise secured package.

Figure 1:
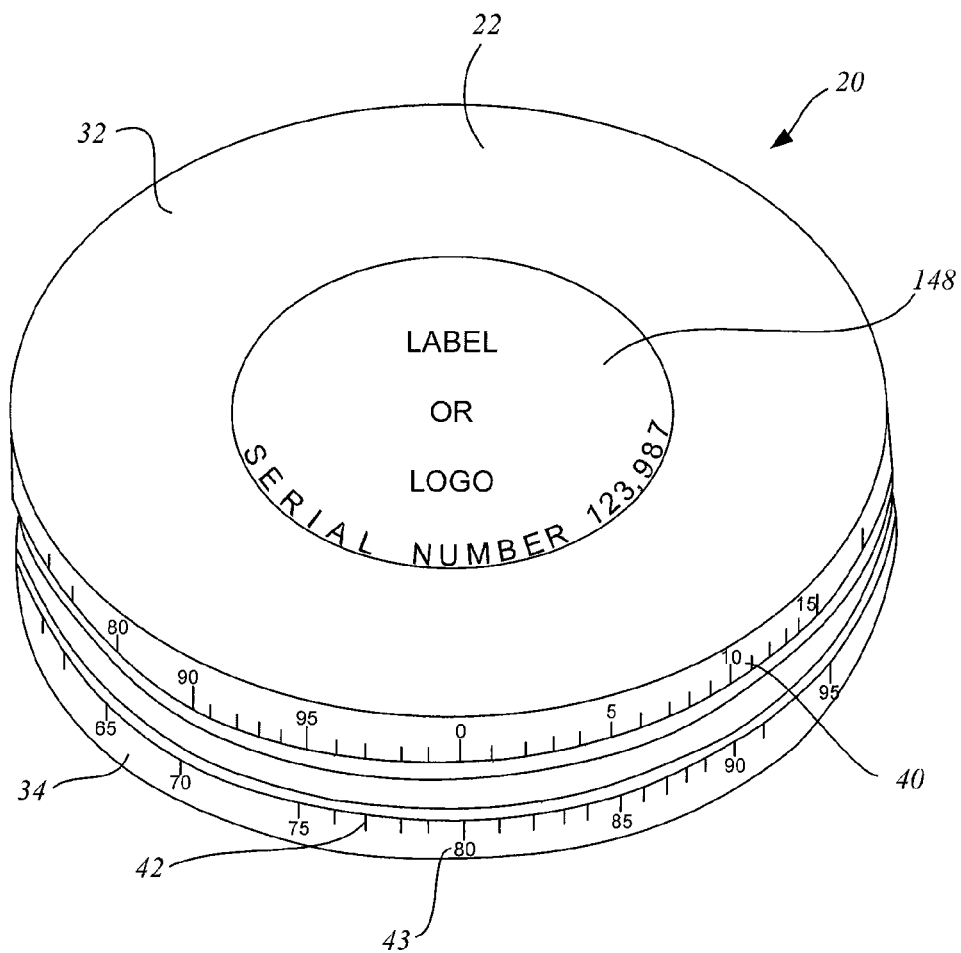
FIG. 1 is a perspective view of a closure apparatus.

Commencing with FIG. 1, a closure apparatus is identified generally as 20. In the most general terms, apparatus 20 has a body, or shell, or housing, container, or wall structure 22, however it may be called, that has defined therewithin an enclosure space, or storage volume, or void or chamber or lodgement, or cavity, or accommodation, however it may be called, which may be identified most generally as 24, into which a user may place, or from which a user may extract, as the case may be, an object 26 to be stored and secured therein.

Object 26 may be any suitable object having an appropriate physical extent for placement within accommodation 24. Depending on the size of closure apparatus 20, in some instances object 26 may itself have the form of a body of revolution, such as a disk or cylinder, or doughnut shaped object. In some instances object 26 may be an audio or video data storage medium, whether of an analogue or digital nature. For example, a disk shaped enclosure might, in one circumstance, be used for carrying or securing a magnetic recording tape, whether of voice recordings or digital backup data; in another circumstance a rare and precious pressed wax or vinyl recording, whether of 78, 45 or 33⅓ rpm variety; in another instance it may contain a reel of cellulose with data carried thereon, such as motion picture film, be it 8 mm, 16 mm, or 35 mm or wider; in another instance it may contain a CD-ROM or a DVD, or other digital storage medium such as a CD-R, a minidisk, a "smart card" or a Memory Stick™. An accommodation for such a device may have the form of a squat cylinder, or squat doughnut, in which the ratio or the radius or the disk may be at least three times the thickness of the disk, and for objects such as CD-ROMs or DVD's may be greater than 10 to 1. Such an accommodation may be roughly 5 inches in diameter and ¼ to ½ inch thick, for example.

Closure apparatus 20 may include a bed 28 for the object to be stored, and may include locking apparatus identified generally as 30, which may be in the nature of a mechanically operable combination lock device. For the purposes of this description, bed 28 may include snap detent clips for a CD-ROM or DVD such as a commonly found in "jewel case" boxes or DVD packages. The specific nature of the bed may vary depending on the object to be contained in apparatus 20. Locking apparatus 30 may include a few members or features of apparatus 20, or it may include substantially the entire assembly.

For example, apparatus 20 may include first and second opposed wall members 32, and 34. When apparatus 20 is lying on a flat surface, wall member 32 may arbitrarily be termed the top wall, and wall member 34 may be termed the bottom or base wall. It may be understood that the section of FIG. 2 has been radially foreshortened, the better to permit details near the hub 36 and circumferential periphery 38 of apparatus 20 to be illustrated in a larger form. In that regard, $r_1$ may represent the inner radius of an annular object 26 to be stored, such as a CD-ROM or DVD, and $r_2$ may represent the outer radius at the most radially distant circumference. $R_3$ may represent the overall radius of apparatus 20 more generally.

Apparatus 20 may be operable by moving wall member 32 relative to wall member 34 through a step, or series of steps, such as may release locking apparatus 30 to yield access to the interior of accommodation 24, thus permitting object 26 to be introduced into, or removed from accommodation 24. Apparatus 20 may then be closed again, and return to a locked condition.

In one embodiment, apparatus 20 may have the general form of a disk, and wall members 32 and 34 may be moved relative to each other in terms of rotational twisting about the z-axis, being the axis or rotation of apparatus 20, and may operate a locking mechanism that may operate in a manner similar to a combination padlock, in which one member, be it wall 32, may be considered the rotor, or knob, or crank, of the padlock, and the other member, be it wall member 34, may act as the stator, or housing or stationary member. To that end, one or both of wall members 32 and 34 may be provided with positional indicia, 40, 42 respectively, which may be located in a position at or near the outer circumference thereof, to permit relative positioning of the one relative to the other. Indicia 40 or 42 may be a single mark, datum, or reference, or pointer on one, and an array of markings, such as may be alphabetic or numeric as at 43, or an array on both. It is arbitrary whether the reference mark or pointer is on the rotor or the stator. In one series of steps, the rotor may be turned relative to the stator far enough in one direction, (be it clockwise for example) to pick up all its internal elements, and is then stopped in a first position. The rotor is then turned in the other direction (be it counter clockwise, for example) for a full revolution, then stopped at a second location, then turned again in the first direction to a stopping point, at which time the lock combination may then be complete, and the lock may be opened. In this type of lock, there is no key to be lost.

Figure 2:
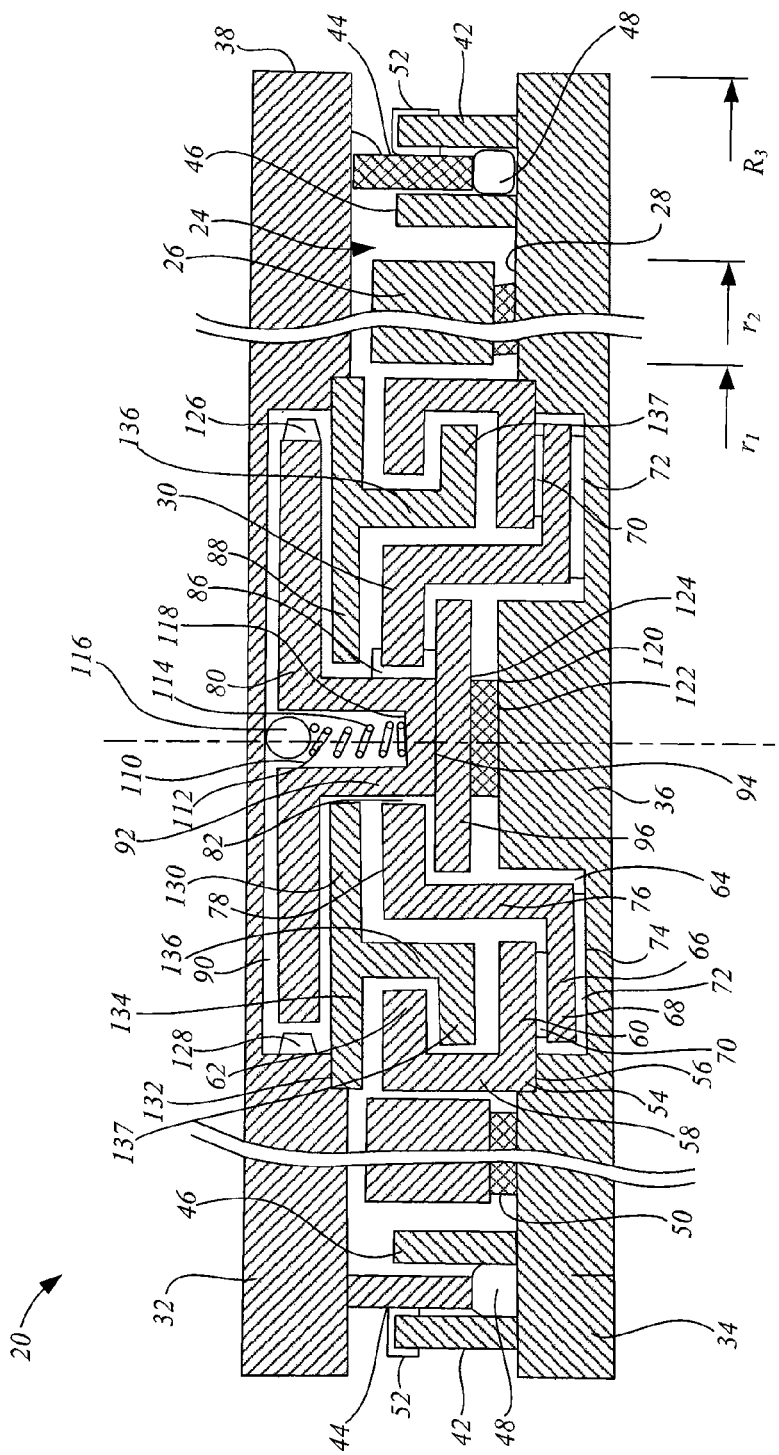
FIG. 2 is a diametral cross-section of the closure apparatus of FIG. 1.

Considering FIG. 2 in detail, walls 32 and 34 may have a set of mating peripheral circumferential members 44, 46, 48, respectively, which may be seal members, that may be mutually engageable to form a closed seal about the periphery of apparatus 20 more generally. The seal so formed may not necessarily be airtight, but may include a captured resilient seal member 48, such as an O-ring. An interference fit or wiper seal 52 may also, or alternatively, be employed. Radially inboard of this is object 26, which may lie or rest on a seat, liner, or cushion 50 and may be held in place by spring clips, such as a known in CD jewel cases and DVD cases, for example.

Apparatus 20 may include a first fixed member or wall, identified as a stator member or outer stator ring 54 that may be fixedly mounted to wall member 34 in a recess, rebate, or annular groove or shoulder such as may be identified as 56. Outer stator ring 54 may be made in more than one part, and glued or fastened together on assembly, as may be. Outer stator ring may include a circumferential, axially extending wall or web, 58, a first flange, leg or annular wall 60 extending radially inwardly therefrom adjacent wall 34, and a second flange, leg or wall 62 extending radially inward from the distal end of web 58. Radially inward of the mounting shoulder of wall 34 may be a rebate, relief, or accommodation or recess 64, which may be annular in nature, for accommodating a moving member in the nature of a secondary rotor member 66, that may have the rough general shape of a "hat section", particularly as seen in cross-section in FIG. 2. Secondary rotor member 66 may include a radially outwardly extending wall, flange or leg, 68 which may have the general shape of a ring seated in recess 64. A biasing member 70, which may be in the nature of a Belleville spring, may be located between leg 60 and leg 66, and may serve to urge the axially outward face of leg 66 against a friction member, which may be in the nature of a pad or liner 72 mounted to the axially inwardly facing surface 74 of recess 64. Pad or liner 72 may tend to provide frictional resistance to motion of secondary rotor member 66, thus discouraging it from moving unless compelled. In this way, while secondary rotor member 66 may turn, it may also tend to sit in one place if not compelled to turn, and may have a modest amount of resistance to turning and to being dislodged.

Secondary rotor member 66 may also have an axially extending wall, 76 which may extend generally cylindrically away from wall 34 from the radially inward edge of leg 68. Surmounting wall 76 may be a further radially inwardly extending wall, or leg, or flange, or array, such as may be a first keyed array, 78, which may leave a central opening 82 having a profile defined by the shape of array 78, for co-operation with primary rotor member 80. Secondary rotor member 66 may have a motion transmission stub, or shoulder, or torque transmission member, or follower, or spline, or lug, or abutment, 84 which may be part of array 78, and which may interact with a co-operating motion transmission stub or shoulder, or torque transmission member, or driver, or lug, or boss or keyway, or abutment 86, such that, when primary rotor member 80 is turned far enough, abutment 86 will encounter, and then push, abutment 84, thereby driving secondary rotor member 66 to such position as it may. When primary rotor member 80 is turned far enough in the other direction, it may tend to drive secondary rotor member 66 in the other direction. It may be noted that there is a large degree of dead motion between these conditions, that dead motion approaching a full turn of primary rotor member 80 (over 300 degrees of arc, perhaps).

Primary rotor member 80 may include a circular or annular base member 88 that may seat in an accommodation 90 in wall 32, and an axially protruding or extending boss, or shaft or cylinder 92 that may extend away from wall 32 and toward wall 34. The axially inwardly distant end 94 of cylinder 92 may carry a radially extending plate or disk, or keyed array 96 that may have a profile that is co-operatively interoperable with the profile of opening 82 of secondary rotor member 68. For example, keyed array 96 may have the negative profile matching the positive profile of opening 82 such that, when aligned, the one profile may pass through the other. Although a regular array of teeth of uniform length may be used, with the teeth being spaced on a particular schedule of pitch spacing such as uniquely to match the corresponding profile at a unique angular orientation of primary rotor member 80 relative to secondary rotor member 82, in the general case, the "teeth", or features of the profile, may be of irregular length, irregular pitch, and irregular breadth. They may include features having a first length and a shoulder. In one embodiment, one of either the male or female profiles may include a single tooth, and the other may be a circular disk with a single notch cut in it to accommodate the single tooth when aligned at a particular angle. As noted, the representation of primary rotor member 80 and secondary rotor member 66 is intended to be generic.

The general conceptual idea of the co-operatively mating sets of "teeth", as may be, is shown in the more schematic representation of FIGS. 3c and 3d. When the primary and secondary rotors are not set in the correct position, their teeth, symbolised by 100 and 102 for primary rotor member 80 and 104, 106 for secondary rotor member 66, when overlapping as seen from above, are misaligned, and so therefore cannot pass through each other, the parts being held in a captive, or closed, position as in FIG. 3d. When the teeth are in the aligned position, in which each set of teeth is aligned with gaps between the other set of teeth, as in FIG. 3c, the two sets of teeth can pass through each other, the parts can be disengaged, and the assembly may be moved to an unlocked, or open position.

Primary rotor member 80 may also include a central bore 110 such as may accommodate a biasing member 112, which may be a spring 114 which may be surmounted by a ball bearing 116 that is biased by spring 114 into central point contact with the bottom wall 118 of accommodation 90, and which may present little resistance to rotational relative movement therebetween. Wall 34 may have a radially centric, axially inwardly upstanding pedestal or boss or seat 120 that may support, or provide a backing for a friction member 122, such as may be a pad or liner, whether of Nylon, or graphite or other suitable material, that may present modest resistance to rotational motion or displacement of primary rotor member 80 relative to seat 120, and hence to wall 34. That is, the urging of biasing member 112 may tend to urge face 124 of primary rotor member 80 into frictional contact with friction member 122, thereby tending to resist, somewhat, rotational motion or displacement. Primary rotor member 80 may also have a rotational motion transmission member, such as may be a torque transmission stub, follower, or lug or abutment, identified as 126, which may be mounted to a radially outwardly facing peripheral face thereof, for co-operative interaction with a mating rotational motion transmission member, such as may be a torque transmission stub, driver, lug or abutment 128 which may be mounted to a radially inwardly facing portion of wall member 32 adjacent accommodation 90. Abutments 126 and 128 may be taken to interact in the same manner as abutments 84 and 86, such that motion of wall 32 sufficiently far in one direction (anything exceeding a full turn, for example, would do) will tend to pick up the follower abutment 126 on the driver abutment 128. Motion in the other direction may tend to achieve the same result, with a significant dead band, possibly as much as about 330 degrees of rotation, between contact. The size of this dead band depends on the relative circumferential extent of the mating abutments, and can be smaller, or much smaller than 330 degrees. When primary rotor member 80 is left in one position, it may tend to stay there, given the friction members, unless urged to move by the interaction of the abutments.

A second stator member, 130, may be fixed to wall 32 as for example in a seat or shoulder, or relief or recess 132. Stator member 130 may include a radially extending plate or leg, or ring 134 such as may tend to capture base member 88 in accommodation 90 in a loose fit. Stator member 130 may also include an axially extending wall 136 that may be generally cylindrical, and that may extend away from ring 134 toward wall 34. At the distant edge of wall 136, stator member 130 may have a radially outwardly extending plate, leg, or flange 137 that may include an array of teeth, or indexing fittings 138, in like nature to those of primary rotor member 80 and secondary rotor member 66 to yield a keyed engagement profile co-operatively operable with the mating female (or male as may be) profile of leg 62 in the same, or an analogous manner to that described above in the context of primary rotor member 80 and secondary rotor member 66. It will be understood, again, that many variations are possible.

In terms of operation, a user may be provided with a code of numbers for operation of apparatus 20. That code may include three numbers, or three pairs of numbers, and turning directions. The steps of operation may include turning wall 32 with respect to wall 34 more than two full turns in a first direction, and stopping at a first number of number pair of indexing indicia 40 or 42 (or both, as may be) to place secondary rotor member 66 in a given position relative to wall 34. It may then include the step of reversing the direction of relative rotation of walls 32 and 34 for a full turn, and turning another distance to stop at a second number, or pair of numbers of indexing indicia 40 or 42, (or both, as may be) to move primary rotor 80 to a given position relative to the given position of secondary rotor 66. It may then include the step of reversing direction again, and turning another distance to stop at a third number, or combination of numbers of the indexing indicia 40, 42 to complete the sequence, and to leave wall 32 in a given position relative to wall 34 such that both sets of teeth are aligned, and wall 32 may be separated from wall 34, to give access to accommodation 24, and the contents thereof, such as object 26. In that regard, the teeth of leg 68 are indicated conceptually as 140 and 142 in FIGS. 3c and 3d, and the teeth of indexing fittings 138 are identified as 144, 146. The rotor and stator portions of apparatus 20 may be identified by the placement of markings, such as decorative markings, or advertising, or trade-markings on the outside, generally planar faces of walls 32 and 34 as shown at 148. The external markings may also include a serial number and in one embodiment a purchaser or user of apparatus 20 may contact a vendor or sender of apparatus 20 by electronic or other independent means to obtain a combination or code for operation of apparatus 20 once either payment has been made, proper identification established or authorization to obtain access to object 26 has been established or verified, or both. That is, apparatus 20 may be used in the delivery of confidential or proprietary information according to the steps of receiving a request of order for particular information sending that information encrypted, encoded or otherwise stored on object 26 and the step of verifying the authorization of the receiver to use that information whether by receipt of payment, verification of identification for the recipient or other form of authorization or any combination thereof at which time the combination or code may be communicated to the recipient.

In this apparatus, the accommodation for the object to be stored, and, in use, the object to be stored, lies within the envelope of the locking apparatus itself, with the accommodation 24 being between the two relatively rotatable externally graspable parts, namely walls 32 and 34 which act as rotor and stator. In the case of an annular object to be stored, or an annular storage chamber, the locking apparatus also lies, in whole or in part, within the core of the annulus. The locking apparatus, which may include wall 32, wall 34, primary rotor member 80, secondary rotor member 66, and the various tooth members thereof, may be self contained, and may rely on a combination, rather than a physical or electronic key. An electronic key could be used in addition to a physical combination lock as shown and described. Although some feature of apparatus 20 are illustrated as being monolithic, they may be made in sections that may be glued or fastened together after assembly with other parts such that internal parts may be installed before being locked in place by another part or assembly of parts. The various parts may be made from fibre-reinforced plastic resins, plastic resins more generally, or metals such as aluminium or steel, (which may include stainless steel) or other suitable material, as may be.

Figure 4:
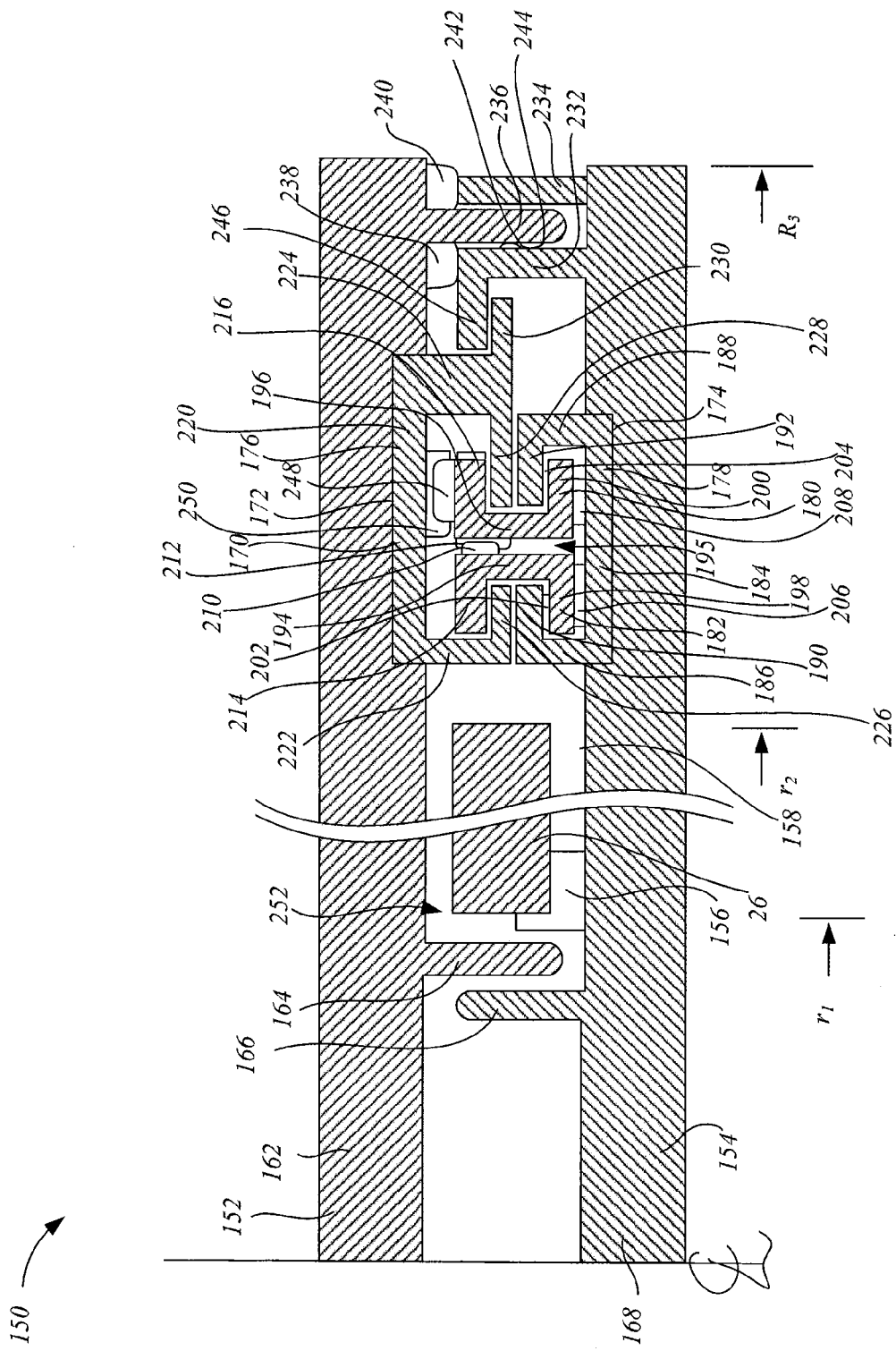
FIG. 4 is a scab portion of a diametral section of an alternate closure apparatus to that of FIG. 1.

In an alternate embodiment as shown in cross section in FIG. 4, there is a closure apparatus indicated generally as 150, although it may have a somewhat greater overall outside radius, $R_3$. Apparatus 150 may be taken as having the same, or similar, external appearance as apparatus 20, including markings to designate, be it nominally, the rotor and the stator members, arbitrarily designated 152, 154 respectively, and external indexing indicia, namely items 40 and 42, as before, to permit the relative rotational positions of the stator and rotor members to be determined. In the alternate embodiment of apparatus 150, object 26 may seat in a bed 158, that may have a liner and spring clip devices identified generically and schematically as 156. Rotor 152 may include a main wall member 162, which may be substantially planar, and which may be substantially circular in plan view, proceeding radially outwardly from the centerline, rotor member 152 may have a depending (i.e., axially inwardly extending) central circular wall, or boss, 164, which may be hollow, such as may seat in mutually nesting arrangement with an axially inwardly extending central circular wall (which may be hollow) or boss 166 of opposed wall member 168 of stator 154. Opposed wall member 168 may be of the same general profile as wall member 162, which profile may be circular. Standing radially outwardly of bed 158 is a locking mechanism, indicated generally as 170, which may be a pre-assembled unit that may seat in fixed mountings in opposed recesses 172 and 174 of wall members 162 and 168 respectively.

Mechanism 170 includes first and second annular stator members 176 and 178 that seat in fixed position with respect to walls 162 and 168 in recesses 172 and 174 respectively. Two rotor members 180 and 182, being the primary and secondary rotor members, may seat co-operatively with stator member 178. Stator member 178 may have the form of an annular member with a channel section, the channel section having a back 184, two upstanding legs 186 and 188, and two opposed legs, or flanges 190 and 192 that extend from legs 186 and 188 toward each other, leaving a gap 195 therebetween. Back 184 may be in the form of an annular disk, legs 186 and 188 may have the form of inner and outer circumferential circular cylinders that extend from back 184. Flanges 190 and 192 may have the form of circular disks. Rotor members 180 and 182 may have the form of nested rings, each having a channel shaped cross-section. The backs of the channels 194, 196 may be placed back-to-back, with the legs extending radially away from each other. One leg 198, 200, may be captured between back 184 and flange 190, or 192 as the case may be. A biasing member 202, 204, such as may be in the nature of a spring, may be inserted between flange 190 and leg 198 (or flange 192 and leg 200, as may be) to urge the annular face of the opposite side of leg 198 (or 200) against an annular friction member 206, 208, which may be made of a friction material such as those described above, such that while rings 180 and 182 may be turned, there is some frictional resistance to turning so that, unless intentionally impelled, they may tend to remain where they are. As may be noted, secondary rotor member 182 includes a driven lug, or rotational displacement member, or stub, follower, or abutment, 210 as it may be called, and primary rotor 180 has a mating rotational positioning member, lug, torque transfer member, stub, driver or abutment 212, such that, as above, if primary rotor member 180 is turned far enough (one full turn would be sufficient) then abutment 212 will pick up abutment 210, and secondary rotor member 182 will be carried along by the motion of primary rotor member 180. When primary rotor member 180 ceases movement, and moves off in the other direction, secondary rotor member 182 may tend to stay in place relative to wall member 168. If primary rotor member 180 is turned far enough, it will pick up on the opposite side of abutment 210, as described above. The other legs 214, 216 of the primary and secondary rotor members 180 and 182, namely the legs or flanges most distant from wall 168 may have respective keying or indexing patterns formed in then, in the same manner, or similar, to the keying profiles of primary rotor member 80 and secondary rotor member 66 described above.

Similarly, stator member 176 may also have the form of a generally annular channel having a back 220 seated in recess 172, inner and outer circumferential legs 222 and 224, and opposed distant legs, or flanges, or keyed arrays 226, 228 that overlap legs 214 and 216 respectively, and that have co-operable keyed, or toothed, profiles the same as, or analogous to, those of primary and secondary rotor members 80 and 66 described above.

Stator member 176 may also have a further, radially outwardly extending flange or leg, or keyed array 230, that, like the other keyed arrays herein may have at least one indexing member, or "tooth". A seal labyrinth may be formed near the radially outermost portion of walls 162 and 168, such as shown by engaging circumferentially extending walls 232 and 234, being radially spaced apart, and extending from wall 168, and circumferential wall 236 extending from wall 162 to overlap, and to sit in the gap between, walls 232 and 234. One or more O-rings 238, 240, or a wiper seal may be provided, as noted and described above. Mating detents 242, 244 may be provided on male and female circumferential walls to provide a snap-fit closure. The radially inboard circumferential wall may have a radially inwardly extending flange, or leg, or keyed array 246, which may be co-operable with keyed array 230 in the same general manner as the other keyed arrays described herein. In particular, keyed array 230 or keyed array 246 may include a single tooth, which may extend over an arc length of more than half an inch, or an angular arc of more than 20 degrees. Finally, primary rotor member 180 may carry a displacement receiving member, or torque transmission member, or lug, or driven member, or abutment, 248, such as may be mounted to face the back of stator member 176. Stator member 176 may carry a displacement transmitting member, or torque transmission member, or lug, or driven member, or abutment 250 that is co-operable with lug 248 in a manner that may be the same as, or similar to that of abutments 126 and 128.

In operation, wall 162 may be moved, such as by rotation a first angular distance to pick up the primary and secondary rotor members on the various mutually engaging abutments, this distance may be a distance of not more than two full rotations, but further rotation may not cause any harm. Once all of the rotor members have been picked up, rotation may stop at a first location identified on the indexing indicia. Wall 162 may then be turned in the other direction, leaving secondary rotor member 182 in a given position locating secondary rotor member 182 relative to wall 168. Wall member 162 may be turned a second distance, greater than a full turn, to stop at a second position according to the indexing indicia to locate primary rotor member 180 relative to wall 168. Wall member 162 may then be rotated in the first direction again to stop at a third position according to the indexing indicia, thereby locating wall 162 relative to wall 168. In this condition, the various sets of keyed arrays may be in a state of alignment, and closure apparatus 150 may be moved to an open condition in which object 26 may be extracted from or introduced into the space, volume, cavity, recess, lodgement, or accommodation, 252, however it may be called, between walls 162 and 168. In this instance, the locking mechanism lies radially outward of accommodation 252.

Figure 5A:
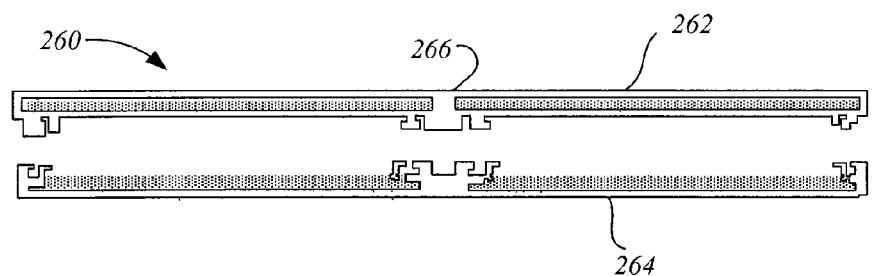
FIG. 5a is a diametral section of an alternate apparatus to that of FIG. 2 or FIG. 4 in an unlocked position.
Figure 5B:
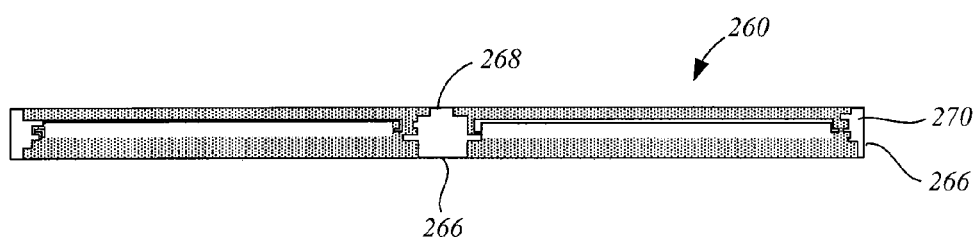
FIG. 5b is a diametral section of the apparatus of FIG. 5a in a locked position.

The embodiments of FIGS. 5a and 5b are intended to illustrate an enclosure apparatus not dissimilar to that of closure (or enclosure) apparatus 20 or apparatus 150, in respective open (FIG. 5a) and closed (FIG. 5b) conditions. As may be noted, in this embodiment, enclosure member, or assembly, 260 has opposed rotor and stator walls 262, 264, and a locking mechanism 266 of which a first portion 268 is at a central boss location, and a second portion 270 is at a peripheral location. The first portion may include primary and secondary rotor members, and the second portion may include the keyed array elements that are mounted in fixed relationship to the first and second walls 262 and 264 respectively. Alternatively, this may be reversed, such that first portion 268 may include the keyed array elements that are mounted in fixed relationship to first and second walls 262 and 264, and the second portion 270 may include the primary and secondary rotor members, as may be.

Figure 6D:
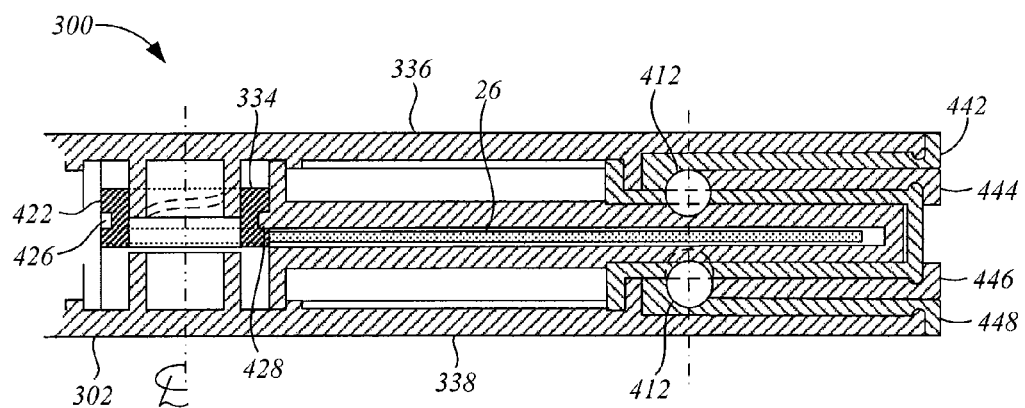
Figure 6A:
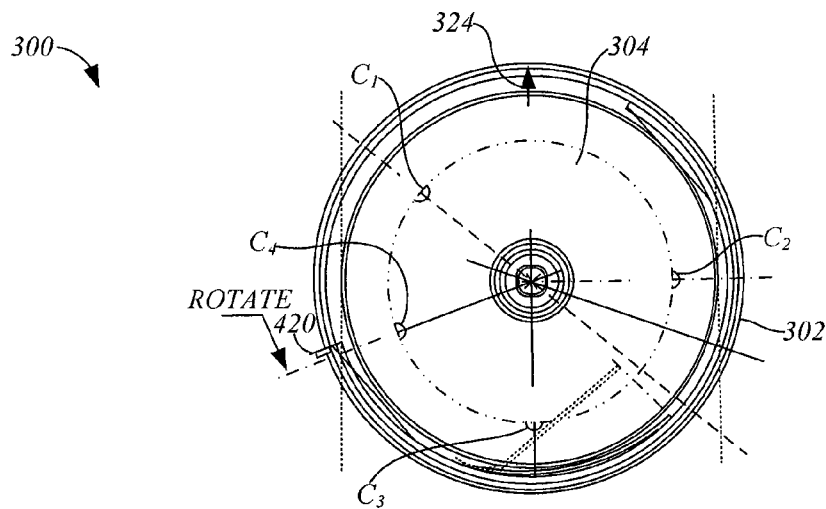
FIG. 6a shows a top view of an alternate closure apparatus to that of FIG. 1 in a first position.
Figure 6B:
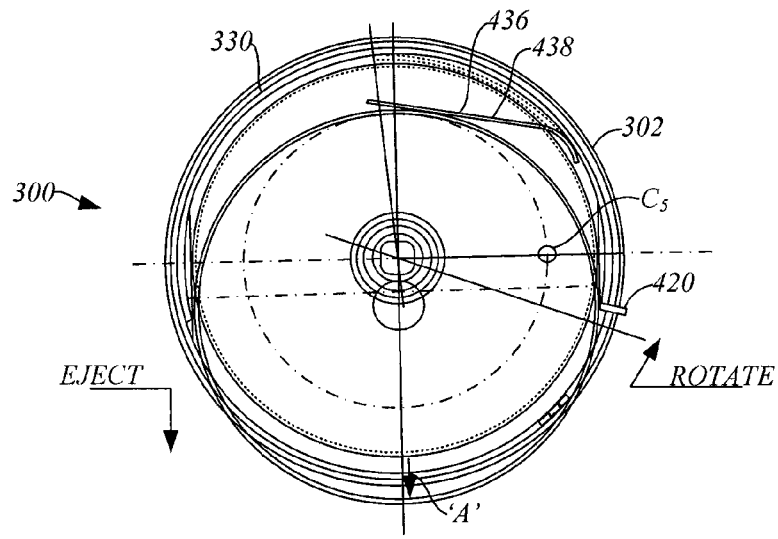
FIG. 6b shows the closure apparatus of FIG. 6a in a second position.
Figure 6C:
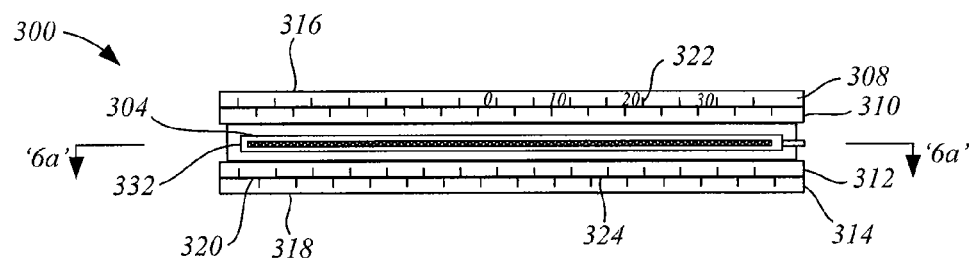
FIG. 6c is a side view of the closure apparatus of FIG. 6a, as opened.

A further alternate enclosure assembly is shown in FIGS. 6a to 6h as 300. Assembly 300 may have the general form of a disk, or squat cylinder, and may be used for the storage, protection, or for maintaining the security of data of, a data storage medium, be it in analogue or digital form, be it on a wax or vinyl pressed disk, a reel of magnetic tape, or a disk such as a CD or DVD, or any of the other types of data storage media noted above. FIGS. 6a and 6b may be taken as views on arrows '6a-6a' on FIG. 6c looking downward, with the position of various locking elements being superimposed the half circles $C_2$, $C_3$, and $C_4$ in FIG. 6a, and the small circle $C_5$ on the phantom pitch circle in FIG. 6b, which may represent the alignment of circles $C_1$, $C_2$, $C_3$, and $C_4$ to permit assembly 300 to be opened.

By way of a general overview, assembly 300 may have a wall structure 302 defining an enclosed space, void, volume, recess, rebate, cavity, lodgement or accommodation in which to place object 26. Assembly 300 may also include a locking securement mechanism, which may be in the nature of a mechanically operable combination lock. That locking securement mechanism may include externally operable movable combination actuators 308, 310, 312, 314, whose positions relative to the upper and lower portions 316, 318 of the wall structure 302 may be set according to indexing indicia 320 on those actuators, be it by way of gradations 322, or a datum or reference mark, and by a reference mark 324 or gradations on wall structure 302, or both, such that unique position of the various actuators may be determined. When those indicia are aligned in a pattern, according to a given code, for example, assembly 300 may be placed in an open position, as opposed to a locked, or closed, position when those actuators are not in the aligned or coded position. Assembly 300 may include an ejector operable to urge object 26 out, or partially out, of accommodation 304 when the assembly is in an open, or unlocked, condition. Assembly 300 may include a carrier 330, and wall structure 302 may be side-opening to permit object 26 to be introduced or extracted by radial translation, rather than the predominantly axial insertion or extraction of apparatus 20, 150 and 260 described above. Carrier 330 may be rotatable inside wall structure 302 to expose or unblock, or to conceal or obstruct a passageway or opening 332 by which access may be obtained to accommodation 304 to permit introduction or removal of object 26 as may be. This is represented in FIG. 6b by the solid line ejected position of object 26, as distinct from the phantom line representation, and arrow 'A' indicating the motion from the phantom line installed position to the solid line ejected position. The installed position of object 26 is shown in FIG. 6a as a solid line. Assembly 300 may also include a movable central locking member 422, or sleeve 334 which may move to an extended or obstructing position to engage a central opening in an annular object to be stored, thus blocking or preventing, or discouraging its removal unless the central locking member is moved to a non-obstructing, or retracted, position. Assembly 300 may be such that wall structure 302 serves not only to define an enclosure for object 26, but also serves as part of the body, or part of the mechanism, of the locking apparatus.

The assembly having been described in general terms, it may be considered in more detail, looking first at FIGS. 7a, 7b, 8a, 8b and 8c. Wall structure 302 may include first and second opposed wall members 336, 338. Although assembly 300 may be substantially asymmetrical about a central plane perpendicular to the axial direction (the z-axis), wall member 336 may be arbitrarily termed the upper wall member, and wall member 338 may be termed the lower wall member, as these items are shown in the illustrations. Inasmuch as assembly 300 may be hand portable, it may be turned to face in any direction, such that upper and lower may be reversed. A generally axially extending core member 340 may be sandwiched between the generally planar, generally radially extending spaced apart wall members 336 and 338 in the location shown in the cross-section of FIG. 8c, fixing the axial spacing of wall members 336 and 338. It may be noted that on manufacture, carrier member 330 may be installed within two halves 342, 344 of core member 340 before those halves are mated and fixed together as by bonding, gluing, welding, or attachment by suitable mechanical fittings. As installed, carrier 330 is able to be displaced angularly about the central axis, identified as centerline CL, relative to wall structure 302.

Figure 7A:
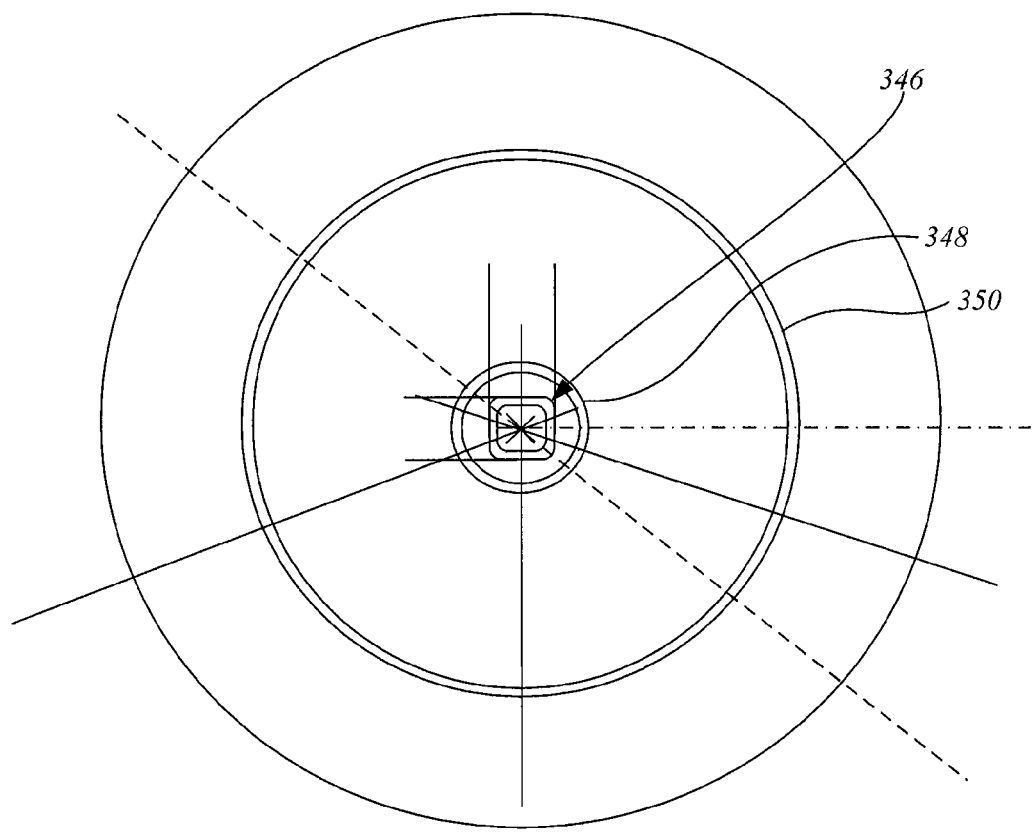
Figure 7B:
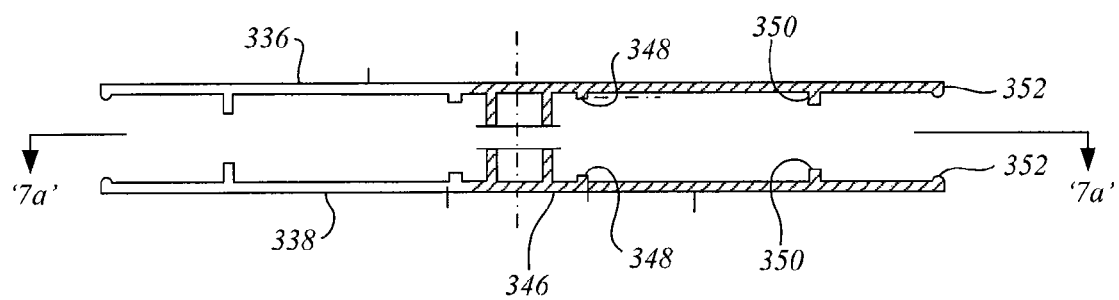

FIG. 7a may be taken as being a representation of either wall members 336 or 338 in plan view from inside, i.e., facing toward the side that would face inwardly into accommodation 304. There is an axially extending central member 346, which may be in the nature of a cylinder, and which may have an indexing feature, such as a spline or keyway, or non-circular profile, such as might discourage a sleeve place thereon from rotational motion about member 346, but which might permit member 346 to act as an axial path or guideway, or track.

Referring again to FIGS. 8a and 8b, core member 340 may include first and second axially extending flanges 354, 356 that locate radially inwardly of, and may be bonded to respective shoulders 350, from which annular webs 358, 360 may extend radially outward to an axially medial peripheral, or circumferential wall 362, upon whose outer face a datum, reference mark, gradations, or other indexing indicia may be indicated, whether by adding a label or writing, or by mechanical deformation such as engraving or embossing.

Core member 340 may also have circumferentially running, axially outwardly protruding lips or detents or blisters 364 that may tend to act to retain rings of the lock mechanism. When assembled in this form (and, it may be noted, the rings of the lock mechanism may be installed before the structure of FIG. 8c is assembled) annular peripheral grooves, or channels, or reliefs, or rebates or lodgements or accommodations 366, 368 are formed in which the rings of the locking mechanism may be located.

Figure 8A:
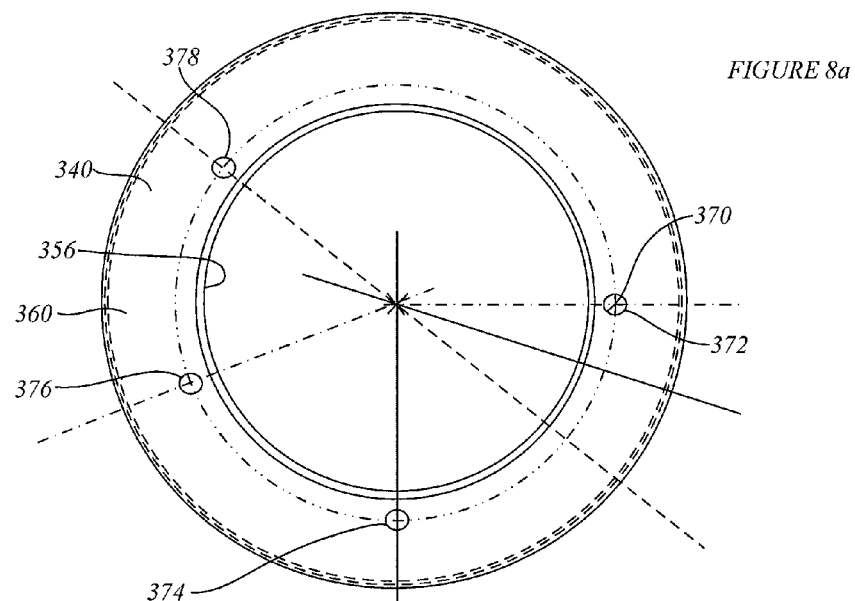
Figure 8B:
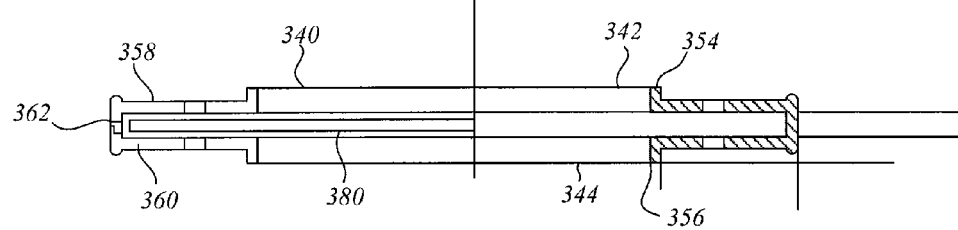
Figure 8C:
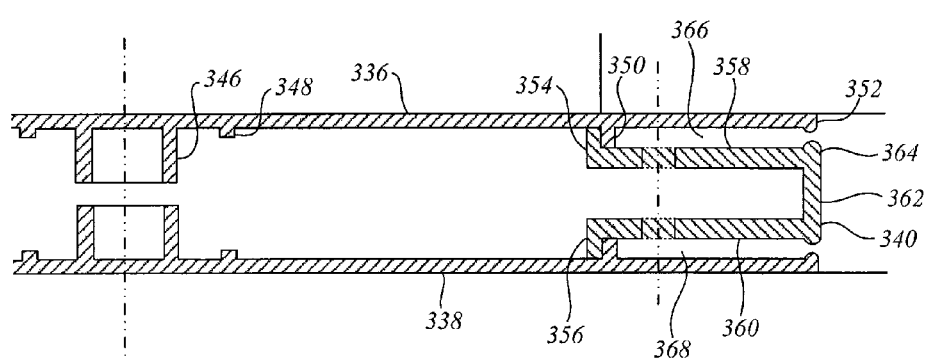
FIG. 8c shows a half sectional view showing the relationship of the casing shell halves of FIGS. 7a and 7b and the peripheral wall member of FIG. 8a as assembled together, without an internal carrier.

It may be noted that the view of FIG. 8a shows an array of irregularly spaced bores 370, which may include individual bores 372, 374, 376, 378, and so on. These bores may be located on a common pitch circle, but not necessarily be if corresponding adjustments are made in other members of the assembly. There may be as few as one such bore, or as many more as may be practicable. The bores may be in either or both of annular webs 358, 360, and need not be aligned. That is, web 358 may have one pattern of bores, and web 360 may have the same or a different pattern. For convenience bores 372, 374, are shown as being made in both webs 358 and 360 in FIGS. 8b, and 8c for the purposes of simplifying this explanation and understanding of the mechanism, but this need not be the case. In the general discussion above, reference is made to four half circles that are aligned to give a single circle when a combination or code of numbers is aligned according to the external indicia. It will be understood that while this may apply for two aligned bores in webs 358 360, in the general case there may be more than one, or more than two, such bores and half circles (or other portions of a circle, as may be) up to whatever number may be practicable. Core member 340 may also have a circumferentially extending peripheral slit, or slot, or opening, identified as 380, of sufficient width and depth to permit the ingress or egress of object 26.

Referring now to FIGS. 9a to 9e, carrier 330 may have the general form of a hollow disk, or cage, having a pair of spaced apart plates 382, 384, which may have a substantially circular periphery, and corresponding peripheral wall 386 extending axially therebetween. Plates 382, 384 may be spaced apart a distance sufficient to accommodate object 26. Similarly, while peripheral wall 386 may have a maximum radius slightly less than the inside radius of wall 362 of core member 340, it may be comfortably more than the maximum extent, which may be a radius, of object 26, such that the internal accommodation or lodgement, or cavity 390 of carrier 330 may accept object 26.

Carrier 330 may also have radially inward, axially extending cylindrical walls 392, 394 that seat within shoulder 348 of core member 340, somewhat in the manner of a trunnion. Walls 392 and 394 may be of the same diameter, but need not necessarily be so. External reinforcements in the nature of webs 396 may extend predominantly radially away from walls 392 and 394 and terminate at a radius falling within the radius of the axially extending outer wall portions of core member 340, and may serve to stiffen carrier 330.

Carrier 330 may have an array 400 of apertures, or recesses, or indentations, or reliefs, or inwardly formed blister cavities, or pockets, which array may include individual pockets, such as may be represented by item numbers 402, 404, 406 and 408. It is intended that this representation and description be generic: there may be as few as one such pocket, or, alternatively, there may be many such pockets. They may be formed in either or both of plates 382, 384, and may tend to be the same in number and distribution as the number and distribution of bores in the array of bores formed on the same radial pitch circles, and circumferential irregular pitches (if more than one is used) as in the array of bores of core member 340. Each pocket may have a major portion 410 formed on substantially the same spherical radius as a ball bearing 412 that may seat therein (the bores of the array of bores in core member 340 may have the same, or possibly a slightly larger radius). Each pocket may also have a minor portion 414 that has a surface 416 that ascends to the planar surface at a gentle angled at an angle alpha, like a cam or wedge surface. This minor portion extends in a circumferential direction relative to plates 382 or 384, yielding a blister of a tear-drop shape, as may be, and is such that when the locking mechanism is aligned for opening assembly 300, operation of radially extending handle 420 will tend to move the sloped cam surface against the ball bearing, causing axial movement of the ball bearing toward, and at least in part through, the bores of the array of bores of core member 340.

The central locking member 422 may have the form of a cylinder or sleeve, 334 that may have an inner cylindrical surface conforming to central member 346, such that locking member 422 may slide axially thereupon, but may tend not to rotate thereabout. Sleeve 334 may have an outer cylindrical surface conforming to the radially inward surface of axially extending cylindrical wall 392 (if not also of wall 394) of carrier 330, and is able to rotate therewithin. Axial motion of sleeve 334 is controlled by a guide, keyway, or follower formed therein, which may be in the nature of an helical groove 426 facing a spud, or protrusion 428 of wall 392, such that angular rotation of wall 392 may tend to work protrusion 428 in groove 426, thereby tending axially to drive sleeve 334 between a obstructing and a non-obstructing position with respect to the central aperture of an annular disk, such as may be object 26.

Carrier member 330 may have a circumferentially opening slot, or passage 430 by which object 26 may be inserted or removed from accommodation 390. Accommodation 390 may include flat side portions, or chords 432, 434 (which may be parallel and opposed) spaced apart a greater distance than the width of object 26, and which may be oriented parallel to a radial bisector of passage 430. Handle 420 may be mounted adjacent to the leading edge of the opening of the slot of passage 430, and may protrude radially outwardly through the corresponding slot of core member 340, such that handle 420 may function as an externally accessible actuator operable to rotate carrier 330 within wall structure 302. It will be understood that as handle 420 moves to open or close the slot opening of passage 430, but aligning it with or occluding it from the slot opening of core member 340, sleeve 424 move in translation to clear, or to obstruct, respectively, lateral motion of object 26 along passage 430.

Ejector 436 may include a biasing member, such as may be in the nature of a resilient leaf, or spring 438 mounted within carrier 330 near the rearward region thereof, such that the cantilevered arm of spring 438 may tend to work against the back side of object 26 and urge it predominantly in the direction of the exit of passageway 430. On insertion of object 26, spring 438 is flexed to a deflected, energy storing position. Upon opening of passageway 430, spring 438 releases its sorted energy to urge object 26 outward.

The locking mechanism of assembly 300 may include a set of movable, co-operable locking mechanism members, or actuators, indicated collectively as 440, that may be move according to a code or combination for aligning their various external indexing indicia to permit ball bearings 412 to leave the blister pockets of array 400 (however many such pockets there may be) and thereby to permit carrier 330 to be rotated with respect to core member 340, it being understood that when ball bearings 412 are partially trapped in array 400, and partially trapped in the bores of the array of bores of core member 340, that rotation of carrier 330 may tend to be inhibited.

Figures 6G, 6H:
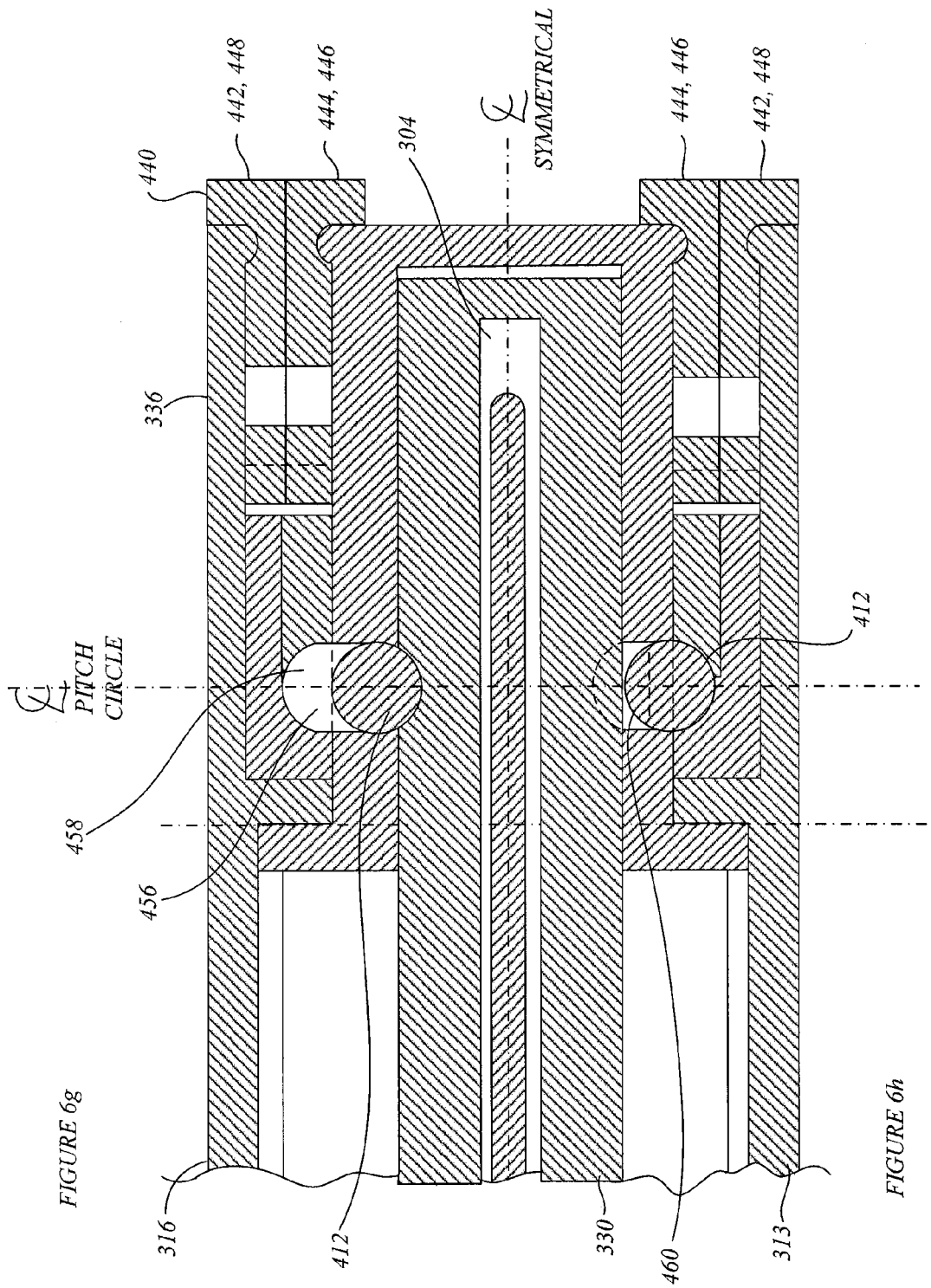
FIG. 6g shows a detail of the closure apparatus of FIG. 6d in a third condition.
FIG. 6h shows a detail of the closure apparatus of FIG. 6d in a fourth condition.

To that end actuators 440 may include a set of rings that may seat in the peripheral circumferential accommodations defined between wall members 336, 338 and core member 340. There may be four locking ring assemblies, 442, 444, 446, 448. In one embodiment there may be four such ring members, with a fixed, pre-determined combination for opening the locking mechanism. Each ring may have an outer end that is externally visible, and that may have indexing indicia embossed on the external peripheral face thereof. This external face may be gripped by the user (or may be provided with a handle, or gripping features, such as knurling, to facilitate grasping, and therefore turning, by hand) Each ring may be rotated with respect to wall structure 302, and each ring may have recesses formed therein at specific locations along the radially inner edge thereof to line up with the bores in the array of bores in core member 340. These portions may correspond to the "half circles" discussed above. Since assembly 300 is symmetrical about a middle plane perpendicular to the axial direction, only two rings will be considered. Ring assembly 442 may have a radially inner end that protrudes past the center line of the pitch circle of the bore arrays. That inner end may have an axially extending flange 450 that, for most of its circumference, block a portion of the exit of the bores of the bore array of core member 340, as shown in FIG. 6*e*. Similarly, ring assembly 444 may have a radially inner end 452 that obstructs another portion of the exit of the bores of the array of bores of core member 340, again as illustrated in FIG. 6*e*. However, flange 450 may have notches, or blind bores, or reliefs 456 formed therein that, when positioned according to a code or combination relative to core member 340, may align with the array of bores, thus no longer obstructing their exits, as illustrated in FIG. 6*f*. Similarly, ring assembly 444 may have reliefs 458 formed in the radially inward edge thereof, that, when positioned according to a code or combination, align with the bore array, no longer obstructing their exits, as shown in FIG. 6*g*. The combined relief so formed may admit the end of the ball bearings, and so release carrier 330, the "half circles" forming the circles described above. The same may be true of ring assemblies 446 and 448. It does not necessarily matter in which order the steps of moving the various ring assemblies 442, 444, 446 or 448 occur, and in which they are moved to their coded locations, but, in the end, when so positioned, the various ball bearings 412 may exit the array of pockets in carrier 330. When the actuator, e.g., handle 420, is moved, ball bearings 412 will be urged into the vacancies presented by the reliefs in ring assemblies 442, 444, 446 and 448, and will remain there as the pockets in carrier 330 move away and a flat planar surface 460 of carrier 330 blocks the other ends of the bores of the bore array of core member 340, as illustrated in FIG. 6*h*.

Figure 10B:
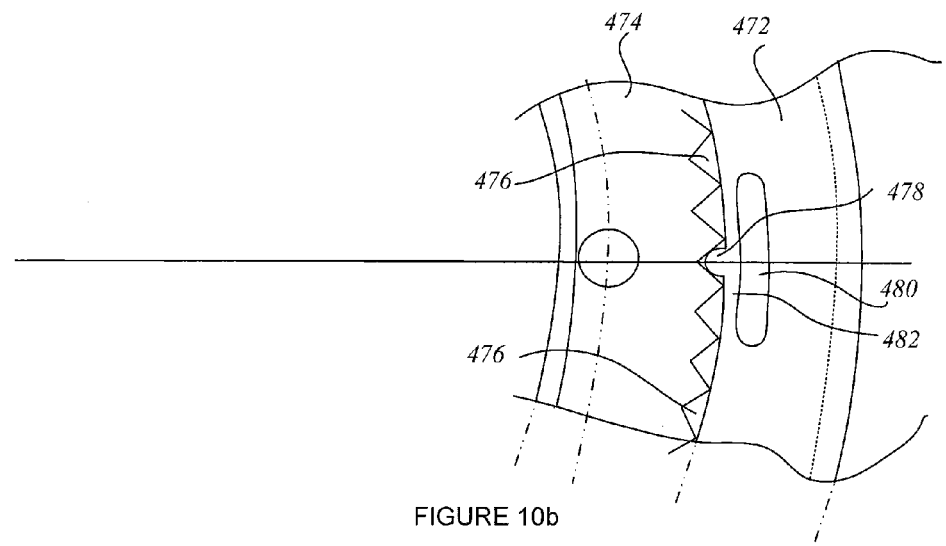
Figure 10C:
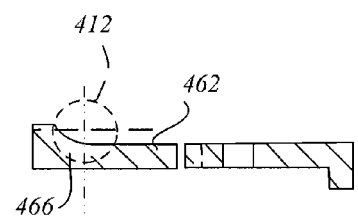
Figure 10A:
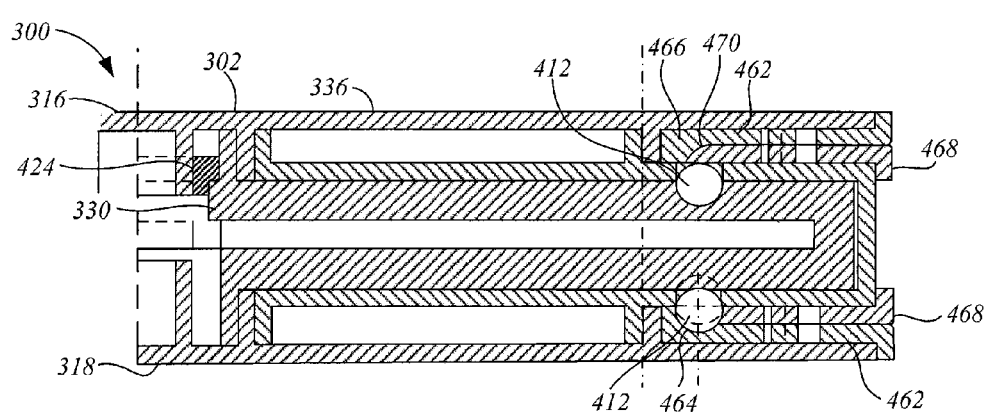
FIG. 10a shows an alternate section of a closure apparatus to that of FIGS. 6e, 6f, 6g and 6h.

It may be noted that the flanges and ends of rings 442 and 444 need not be square with the centerline of the ball bearing as shown, but could split the profile of the bearing relief cavity in a non square manner, as shown in the embodiments of FIGS. 10*a* and 10*b*, in which the end of the axially outer ring 462 has a scooped out relief 464, and a smoothly radiused end 466, and the radially inward end of the axially inner ring 468 has a mating, smoothly tapered or chamfered profile 470 in general, aside from the ball reliefs.

It may be that each ring assembly include an outer ring portion 472 (the part that may be gripped by hand, for example) and an inner ring portion 474. One of (a) outer periphery of portion 472; and (b) the inner periphery of 474 has a profile having a series of pitches or lodgements 476 formed therein, corresponding to the gradations of the indexing indicia of assembly 300 more generally. The other one has a mating, re-positionable engagement member, 478, which may be a protrusion operable to seat in one or another of the lodgements. To the extent that member 478 may be radially resilient, so as to be able to deflect past the apices of the peaks between lodgements, inner ring portion 474 is variably re-positionable relative to outer ring portion 472, thus permitting a change in the code or combination of the device, without necessarily requiring a different set of bore placements for ball bearings 412. I.e., the combination may be changed without drilling a new set of ball bearing bores and reliefs. When assembly 300 is in the open position, the inner portion of each ring assembly will be inhibited from movement by the presence of ball bearings 412 in the end reliefs. As such, appropriate torque applied to the external grip may permit a change of position of member 478 with respect to lodgements 476. It may be that a void 480 is formed radially behind member 478, leaving a neck 482 of resilient material that may flex radially to permit member 478 to move radially in and out, and to bias member 478 into engagement with a selected one of lodgements 476.

Various embodiments of the invention have now been described in detail. Since changes in and or additions to the above-described best mode may be made without departing from the nature, spirit or scope of the invention, the invention is not to be limited to those details.

I claim:

1. An enclosure assembly for a digital storage medium, said enclosure assembly having:
    a body defining an accommodation for a digital storage medium;
    a locking mechanism operable to unlock according to a mechanical combination;
    said locking mechanism being movable between a first, locked condition and a second, unlocked, condition;
    in said locked condition access to said accommodation being obstructed;
    in said unlocked condition access to said accommodation being permitted;
    said enclosure assembly having an axial direction, said enclosure assembly extending in a plane perpendicular to the axial direction;
    said accommodation having an opening through which to introduce and extract the digital storage medium;
    said opening being oriented sideways relative to said axial direction such that removal of the digital storage medium occurs cross-wise to said axial direction; and
    at least a portion of said accommodation is enclosed within the locking mechanism.

2. The enclosure assembly of claim 1 wherein said accommodation is disk shaped.

3. The enclosure assembly of claim 1 wherein said accommodation has a radius cross-wise to the axial direction and an axial depth, and said radius is at least 3 times as great as said axial depth.

4. The enclosure assembly of claim 3 wherein said enclosure assembly is operable to permit radial removal of objects therein.

5. The enclosure assembly of claim 1 wherein said body includes a graspable movable member and a graspable stationary member, each of said movable member and said stationary member having a periphery, and at least a portion of said accommodation lies inwardly of said respective peripheries of said movable member and said stationary member.

6. The enclosure assembly of claim 1 wherein said locking mechanism includes at least one movable annular ring defining a rotor member, said movable annular ring being movable in a circumferential direction relative to said axial direction, and at least a portion of said accommodation lies radially inward of said annular ring.

7. The enclosure assembly of claim 1 wherein said enclosure assembly includes a carrier having said accommodation formed therein, said carrier being mounted within a casing, said carrier having a first port, said casing having a second port, and said carrier being movable within said casing to align said ports to give access to said accommodation.

8. The enclosure assembly of claim 7 wherein said enclosure assembly includes an ejector operable to urge objects out of said accommodation.

9. The enclosure assembly of claim 7 wherein said locking mechanism extends about said enclosure assembly outside of said casing and outside of said carrier.

10. An enclosure assembly for a digital storage medium, said enclosure assembly having an accommodation therein having a lateral extent and a through thickness, half said lateral extent being greater than said through thickness, said accommodation having a size for receiving the digital storage medium; said enclosure assembly has a movable member operable to govern access to said accommodation, said movable member being movable between a first position yielding access to accommodation, and a second position obstructing access to said accommodation, said enclosure assembly including a mechanical locking apparatus operable to secure said movable member in said second position, said mechanical locking apparatus being a manually operable apparatus, said mechanical locking apparatus being releasable according to a mechanical combination, and at least a portion of said accommodation lying inwardly of said mechanical locking apparatus, and, when said movable member is in said first position thereof, access to said accommodation being provided in the direction of the lateral extent such that the digital storage medium is introduced and removed cross-wise to the through thickness.

11. The enclosure assembly of claim 10 wherein said enclosure assembly includes a movable central boss member.

12. The enclosure assembly of claim 11 wherein said central boss member is axially retractable.

13. The enclosure assembly of claim 10 wherein said enclosure assembly is operable to permit radial removal of objects therein.

14. The enclosure assembly of claim 10 wherein said enclosure assembly includes a graspable rotor member and a graspable stator member, and at least a portion of said accommodation lies between said rotor member and said stator member.

15. The enclosure assembly of claim 10 wherein said locking apparatus includes at least one movable annular ring defining a rotor member, said movable annular ring being movable in a circumferential direction about an axis of rotation of said rotor member and at least a portion of said accommodation lies radially inward of said annular ring.

16. The enclosure assembly of claim 10 wherein said enclosure assembly includes a carrier having said accommodation formed therein, said carrier being mounted within a casing, said carrier having a first port, said casing having a second port, and said carrier being movable within said casing to move said first port sideways relative to said second port in a direction cross-wise to the through thickness to align said ports to give access to said accommodation.

17. The enclosure assembly of claim 10 wherein said enclosure assembly includes an ejector operable to urge the digital storage medium out of said accommodation.

* * * * *